UNITED STATES PATENT OFFICE.

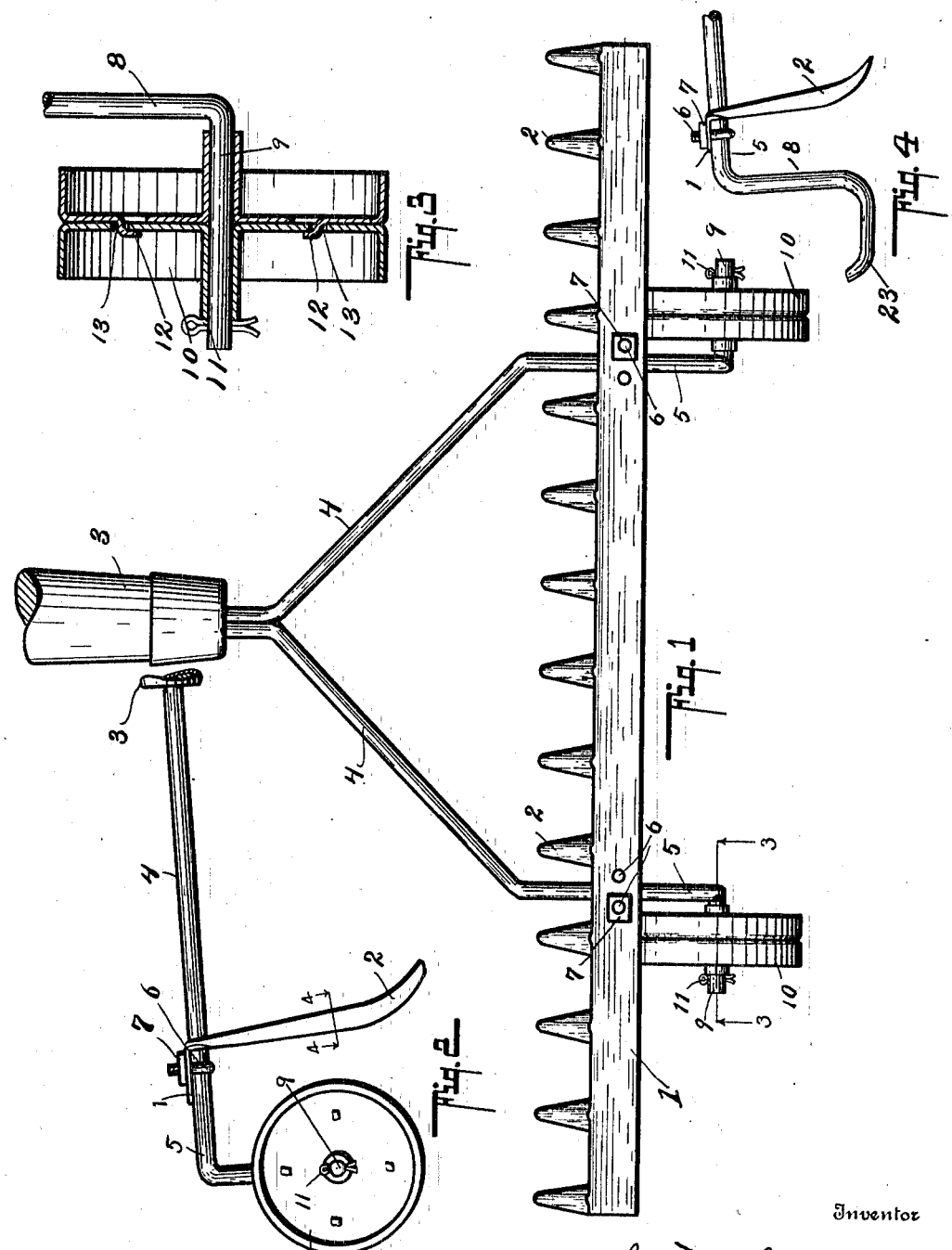

JOHN R. SCHOONMAKER, OF KALAMAZOO, MICHIGAN.

RAKE.

1,059,489.  Specification of Letters Patent. Patented Apr. 22, 1913.

Application filed May 6, 1909. Serial No. 494,354.

*To all whom it may concern:*

Be it known that I, JOHN R. SCHOONMAKER, a citizen of the United States, residing at the city of Kalamazoo, county of Kalamazoo, State of Michigan, have invented certain new and useful Improvements in Rakes, of which the following is a specification.

This invention relates to improvements in rakes.

My improved rake is especially designed and adapted by me as a lawn rake, although it is desirable for use in other relations.

The main object of this invention is to provide an improved rake having wheels which are so arranged that the rake can be very easily manipulated, and also one which is adapted to be adjusted according to the requirements of the particular work.

Another object is to provide an improved rake having strength and lightness.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a detail plan view of a structure embodying the features of my invention. Fig. 2 is an end elevation thereof. Fig. 3 is an enlarged detail section, taken on a line corresponding to line 3—3 of Fig. 1, showing the structure of the wheels and arrangement upon their spindles. Fig. 4 is a detail end elevation of a modification in which shoes are substituted for the wheels.

In the drawing, similar reference characters refer to similar parts throughout the several views, and the sectional views are taken looking in the direction of the little arrows at the ends of the section lines.

Referring to the drawing, the rake head bar 1 and the teeth 2 are preferably formed integrally of sheet metal. The head bar 1 is connected to the handle 3 by means of a suitable shank, preferably consisting of a pair of diverging arms 4, having parallel portions 5, on which the rake head bar is adjustably secured by means of the U-shaped clips 6, the clips being arranged through the bar and provided with nuts 7 whereby they are clamped on the arms 4. The rear ends of the arms 4 are turned downwardly to form wheel supports or hanger arms 8, the lower ends of the arms being turned laterally to form the spindles 9 for the wheels 10. These wheels are provided with hubs which project at each side of the wheels, thus tending to prevent the wheels becoming locked by the entanglement of grass with the spindles, it being found in practice that as the hubs revolve with the wheels, grass picked up by the wheels is not likely to be wound upon the spindles. The wheels are secured upon the spindles by means of the cotter pins 11. The wheels illustrated are made up of a pair of cup-shaped sections arranged end to end, one section being provided with tongues 12 to engage slots 13 in the other section, thus providing a simple and durable form of wheel, which may be made of sheet metal stampings. The wheels, being arranged at the rear of the rake teeth, the position of the teeth relative to the ground may be easily controlled by the raising or lowering of the rake handle. Further, the wheels are so placed as not to interfere with the use of the rake along the walls of a building, fence or other object.

The rake head bar is adjustably mounted on the shank of the handle so as to be adjusted to or from the wheels and thus regulate the teeth, as it will be obvious that the farther forward the rake head is, the less elevation of the handle is required to lift the teeth from the ground, and also, the farther forward the teeth are, the nearer the ground the handle must be held in operating the rake so that the structure is thus adjustable, not only to regulate the clearance, but also, in a measure, to suit the convenience of the particular user.

My improved rake is very easily manipulated and especially designed by me for a lawn rake, or the like. It is, however, adapted for use in various relations.

By arranging the wheels at the rear of the rake teeth, the raising and lowering of the handles effectively gages the position of the teeth relative to the ground, so that the rake may be manipulated to meet the different conditions ordinarily existing. The wheels are so positioned that the rake may be easily shoved backward, and the teeth are effectively cleaned. The V-shaped form of tooth is particularly desirable in that it cleans very easily and quickly.

Having thus described my invention, what I claim as new and desire to secure by Letters Patent, is:

1. In a rake, the combination with a head bar and teeth, of wheels; a handle; a shank for said handle having a plurality of arms, said arms being turned downwardly and thence laterally at their rear ends to provide spindles for said wheels; and means for adjustably securing said head-bar to said shank arms in front of said wheels.

2. In a rake, the combination with a head bar and teeth, of wheels; a handle; a shank for said handle having a plurality of arms, said arms having spindles thereon for said wheels; and means for adjustably securing said head-bar to said shank arms in front of said wheels to permit its being adjusted forwardly or rearwardly thereon.

3. In a rake, the combination with a head bar and teeth; a handle; a shank for said handle having a plurality of arms, the said arms being extended to the rear of said head bar and having supporting members thereon; and means for adjustably securing said head bar to said shank arms in front of said supporting members to permit its being adjusted forwardly or rearwardly thereon.

4. In a rake, the combination of a head bar and teeth, of wheels; a handle; a shank for said handle having a plurality of arms, said arms having substantially parallel portions, the rear ends of said portions being provided with spindles for said wheels; and clips engaging said parallel portions for adjustably securing said head bar thereto.

In witness whereof, I have hereunto set my hand and seal in the presence of two witnesses.

JOHN R. SCHOONMAKER. [L. S.]

Witnesses:
CLORA E. BRADEN,
F. GERTRUDE TALLMAN.

Copies of this patent may be obtained for five cents each, by addressing the "Commissioner of Patents Washington, D. C."